June 20, 1967   G. ORTEL   3,326,736
METHOD OF BUTT JOINING VENEERS
Filed Aug. 1, 1963   5 Sheets-Sheet 1

Inventor:
Gerhard Ortel
By
Lowry & Rinehart
ATTYS.

June 20, 1967  G. ORTEL  3,326,736
METHOD OF BUTT JOINING VENEERS
Filed Aug. 1, 1963  5 Sheets-Sheet 2
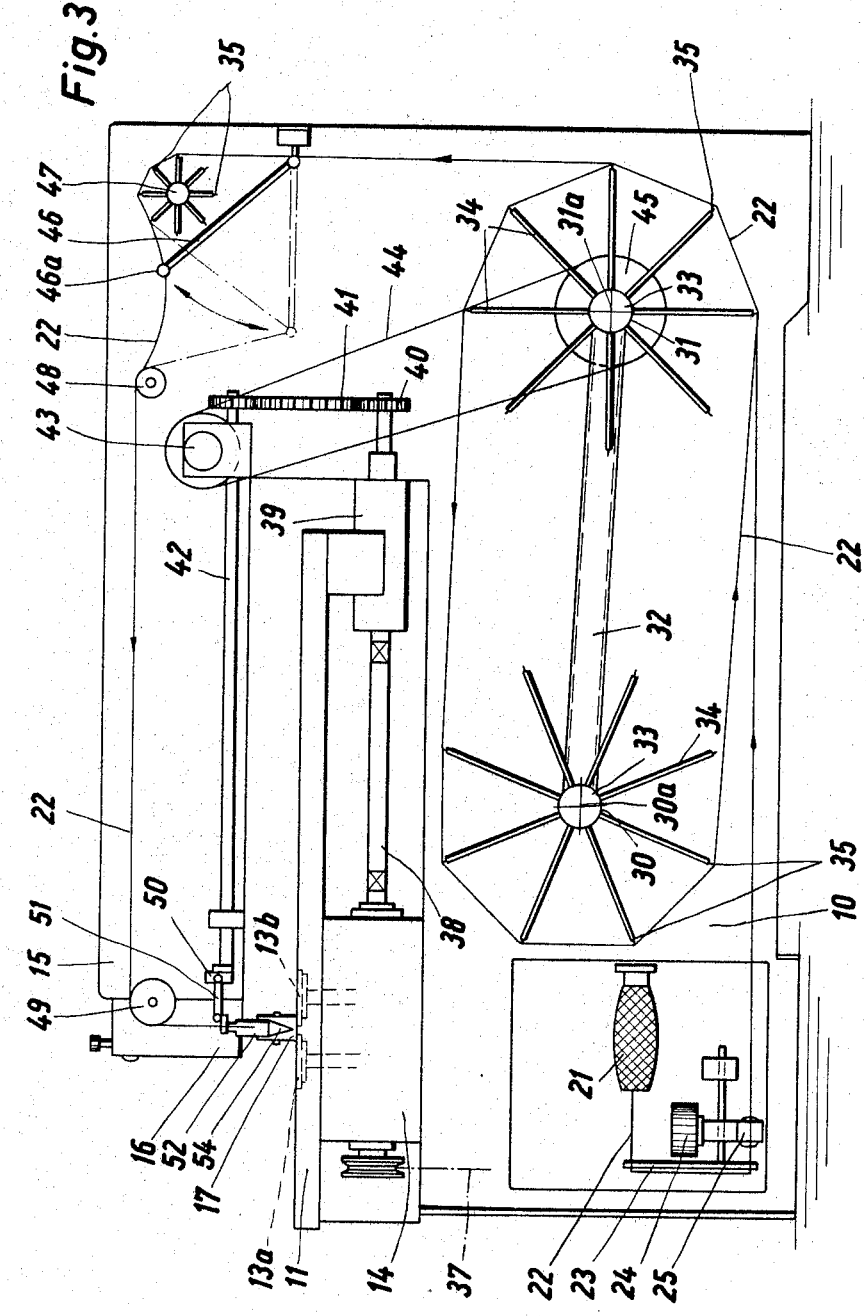
Inventor:
Gerhard Ortel
By
Lowry & Rinehart
ATTYS.

Inventor:
Gerhard Ortel

Inventor:
Gerhard Ortel

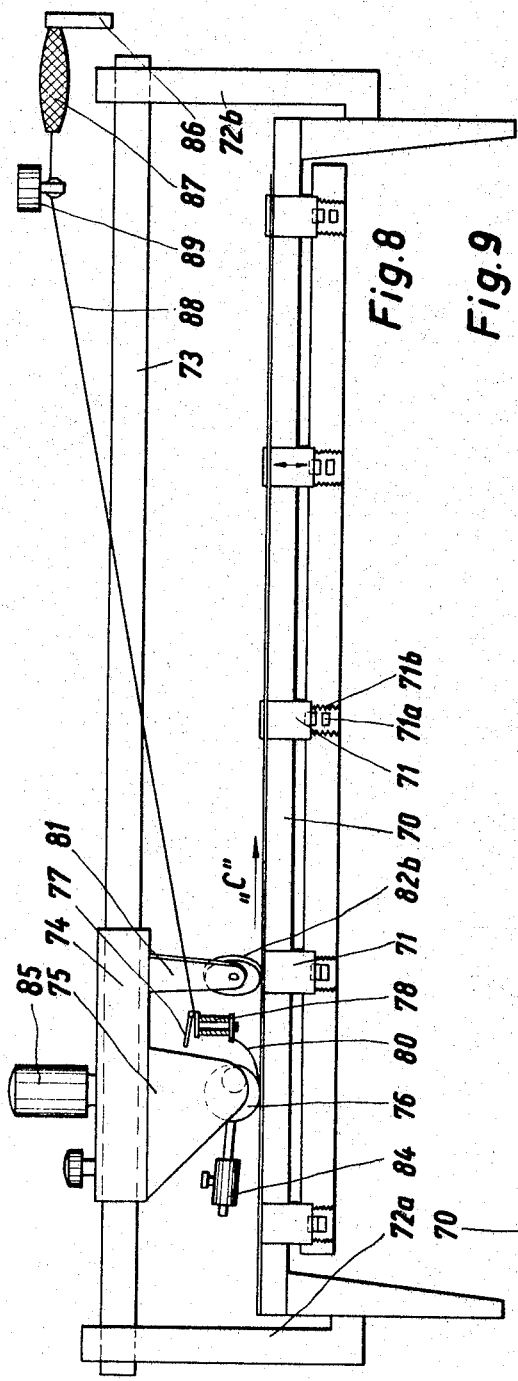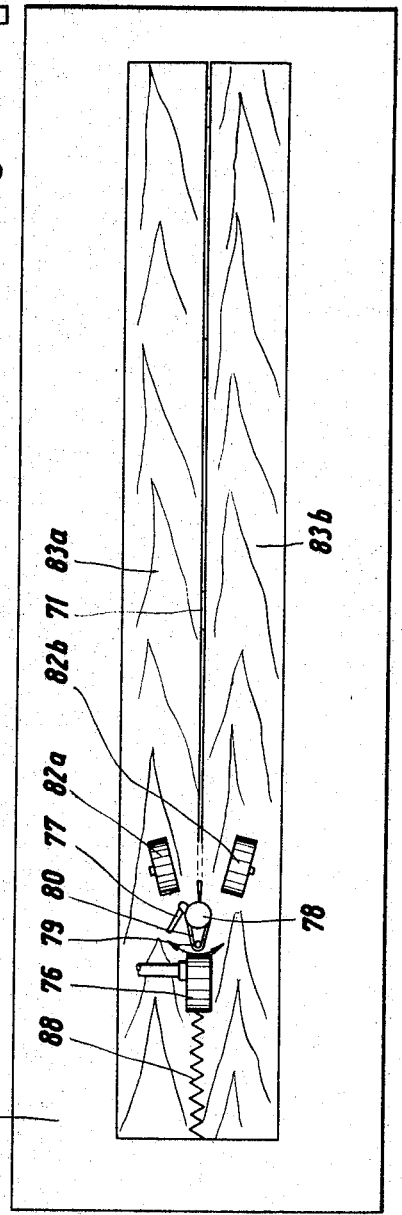

United States Patent Office 3,326,736
Patented June 20, 1967

3,326,736
METHOD OF BUTT JOINING VENEERS
Gerhard Ortel, 10 Torfweg, Rietberg,
Westphalia, Germany
Filed Aug. 1, 1963, Ser. No. 299,223
Claims priority, application Germany, Aug. 4, 1962,
K 47,437; Mar. 15, 1963, K 49,207
3 Claims. (Cl. 156—297)

This invention relates to a method of joining veneers in their longitudinal direction.

Up to the present it is known to connect together veneers by means of a wide strip or band of paper or the like in the region of the edges to be joined.

These strips or bands of paper or the like, which are gummed on one side and may be continuous and perforated or stuck on successively in lengths or pieces, have been found unsatisfactory because, apart from a considerable consumption of paper, they are located on the back of the interconnected veneers, especially fine veneer sheets, as foreign bodies between the middle layer or the like and the covering veneers, and only allow direct intimate glue connection at the most important zone of a veneer joint to be obtained in an unsatisfactory manner. If such strips or bands are located on the outer side of the veneers, they have to be subsequently ground off which is objectionable.

The object of the invention is to provide a method and a machine which will prevent such unsatisfactory joining of the veneers by means of paper strips or bands adhesively mounted over the joints.

The method of joining veneers in longitudinal direction consists according to the invention in gluing a thread on the veneers in a wavy line or in the form of loops extending across the joint alternately on the abutting edge zones of the two veneers.

In a preferred embodiment of the invention a thread composed of several and particularly a large number of fibers, such as a glass-silk thread, plastic thread or textile thread, is previously wetted with an adhesive substance, particularly a contact adhesive, then dried and after being laid on the veneers fitted closely together, is rolled thereon and heat applied at the same time. Such a thread which preferably broadens or spreads when rolled on to the veneers, and forms multifiber bridges at certain distances apart across the joint, which bridges hold the veneers together to a sufficient extent while they are being further worked.

Such a mounted thread is very thin and can therefore be mounted on the back of the veneers without interfering with the subsequent connection of the veneers with their carrier. Threads stuck or rolled on the outer side of the veneers and dried or wetted with an adhesive can be ground off much more easily than paper strips.

An important advantage of adhesively mounting the threads on veneers is that, as compared with the use of paper strips, the run through speed of the veneers can be increased considerably because no setting of an adhesive strip moistened before being stuck on is necessary. A contact adhesive, such as a synthetic adhesive, is preferably used as the adhesive. The thread is pre-wetted with the adhesive and then dried. The coated thread is then pressed on the veneers in the presence of pressure and medium temperature.

The machine for carrying out the method described above comprises a feeding device for the veneers, a pressure roller arranged above said feeding device for pressing a connecting thread on to the veneers, a swing arm arranged in front of said pressure roller and capable of swinging across the joint of the abutting veneers, and a thread feeding device carried by said swing arm guiding the thread to said pressure roller.

In another embodiment of the invention a swing arm turning for example about a vertical axis may be equipped with a funnel or eye-shaped guiding device and be operated by means of an eccentric drive.

The machine proposed by the invention preferably comprises a worktable extending under the pressure roller, a housing under said worktable accommodating the driving mechanism synchronously operating the veneer feeding device and the eccentric drive for the swing arm.

The connection between the driving mechanism and the eccentric drive is preferably established by a driving shaft above the worktable, a second shaft below the worktable and a transmission gear between the two shafts.

In the upper and/or lower part of the machine column conducting means for the thread, such as reel wheels may be provided each of which comprises a hub with spokes uniformly distributed around its periphery, each spoke carrying a very thin supporting plate for transporting the thread. Owing to the slight thickness of the plate, a perfect transport of the connecting thread is possible without damaging the thread or removing or scraping off the adhesive applied and dried thereon. At the same time it is advisable in the case of reel wheels running parallel to each other side by side to arrange the axles of these wheels so that they are displaced in an inclined position to facilitate the running of the thread.

The machine for gluing together veneers as proposed by the invention, ensures a perfect joining of two veneers because, by the arrangement of a swing arm carrying a guiding arrangement, only a thin connecting thread can be applied which lies alternately on the edge zones of both abutting veneers and is pressed tightly and glued on these veneers by a following pressure roller.

The pressure roller is preferably partly covered by a housing and equipped with a heating device, and an air nozzle connected up in series with a heating coil controlled by a thermostat may be accommodated in the housing of the pressure roller.

The invention will now be described by way of example and with reference to the accompanying drawings, in which:

FIG. 3 is a front elevation, partly in section, of a modified form of construction of a veneer gluing machine;

FIG. 8 is another side elevation of a modified form of construction of the veneer joining machine, and FIG. 9 is a top plan view of the thread guiding device on the veneer joining machine according to FIG. 8.

Figure 1:
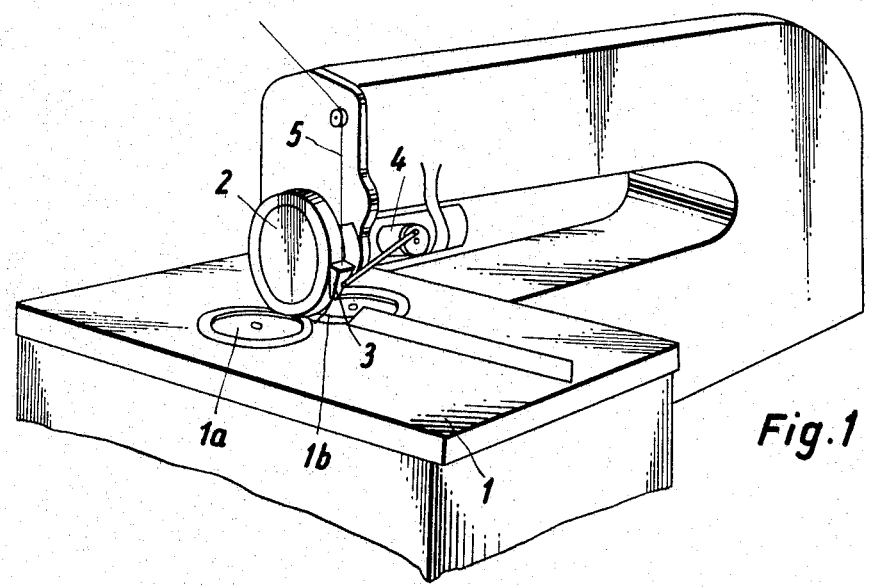
FIG. 1 is a perspective view of a machine for gluing together veneers with feed discs mounted in a worktable and an upper pressure roller preceded by a thread guiding device.
Figure 2:
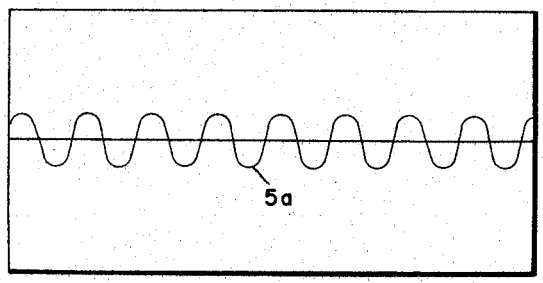
FIG. 2 is a top plan view of two veneers joined by a thread laid in serpentine form.

In a worktable 1 of a veneer joining or gluing machine (see FIG. 1) two plate discs 1a and 1b are arranged to rotate in opposite directions and press together the edges of veneers (not shown) passing through the machine to form a tight joint. Above these discs 1a and 1b a pressure roller 2 is freely rotatable and heated in such a manner that its outer rolling surface has a temperature of for example 100° to 250° C. The pressure roller 2 is preceded by a guiding device 3 for example in the form of a funnel or eye which is moved to and fro transversely to the run-through direction of the veneers by means of an eccentric drive 4 or the like. A thread 5 is fed from about and passes through this feeding device 3 and, by the movement thereof, is laid in serpentine form as at 5a on the two veneers fitted closely together (FIG. 2). This preferably multifibre thread 5, for example a glass silk thread, which is previously wetted or coated with an adhesive and subsequently dried and fed in dry state, adheres to the surface of the veneers passing through the machine merely by rolling with the aid of the heated pressure roller 2 which melts the adhesive coating and thereby causes the thread 5 to stick firmly on the veneers. The adhesives which come chiefly into question are known as contact or synthetic adhesives which need not be moistened directly before they are brought into contact with the veneers but adhere to the wood on being subjected to pressure and heat without however penetrating the wood.

The resiliently mounted pressure roller 2 can easily adapt itself to veneers of different thicknesses, whereby the lower plate discs 1a and 1b compensate for any slight differences between the two veneers by lever compensation or the like so that the multifibre thread 5 is spread as flat as possible and stuck on the veneers. The shape of the serpentine lines is determined by the speed at which the veneers pass through the machine and the number of strokes of the eccentric drive 4.

A thread 5 stuck in this manner holds the joined veneers tightly together. It can be stuck either on the back of the veneers or on the front side thereof from which it can be ground off quickly.

Figure 2A:
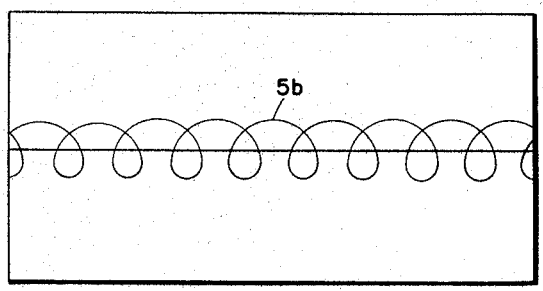
FIG. 2a is a top plan view of two veneers connected by a thread laid in loop form.
Figure 4:
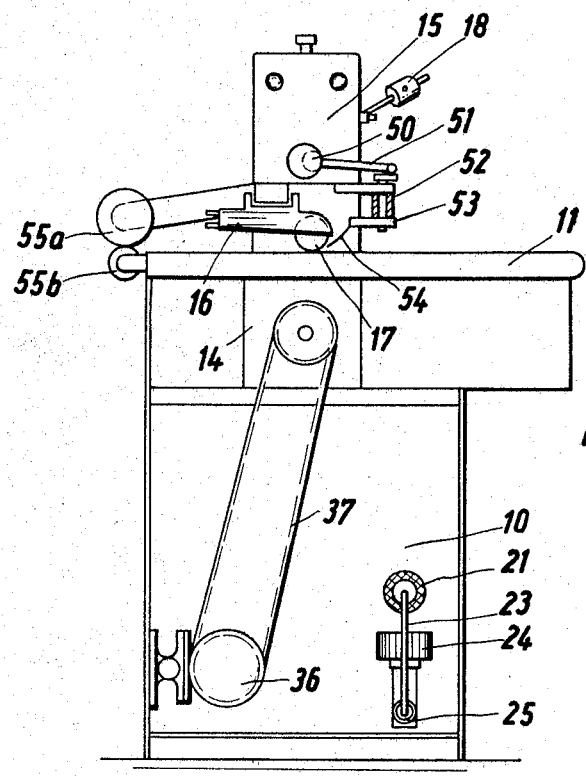
FIG. 4 is a side elevation of the veneer gluing machine of FIG. 3.

FIGS. 2 and 2a show two different ways in which the thread can be laid. The curves or loops of the thread engage the neighbouring veneers fitted tightly together for example every 5 to 20 mms. and extend over the edge zones thereof in the form of a wavy line as at 5a or loops 5b, and it can be of zig-zag shape or the like.

Figure 5:
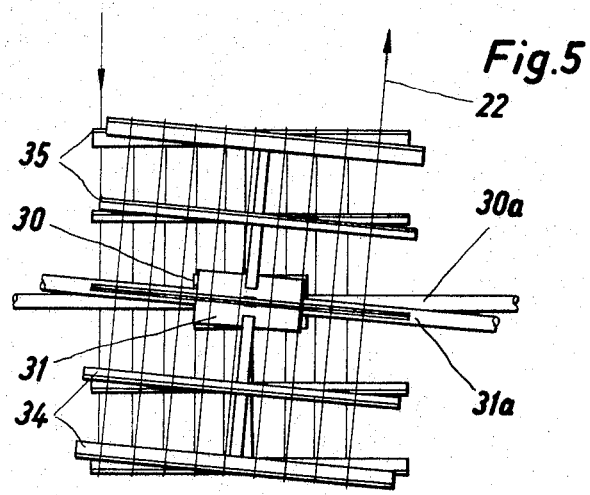
FIG. 5 is a diagrammatic view of two series-connected reel wheels for feeding the thread on the same veneer gluing machine.
Figure 6:
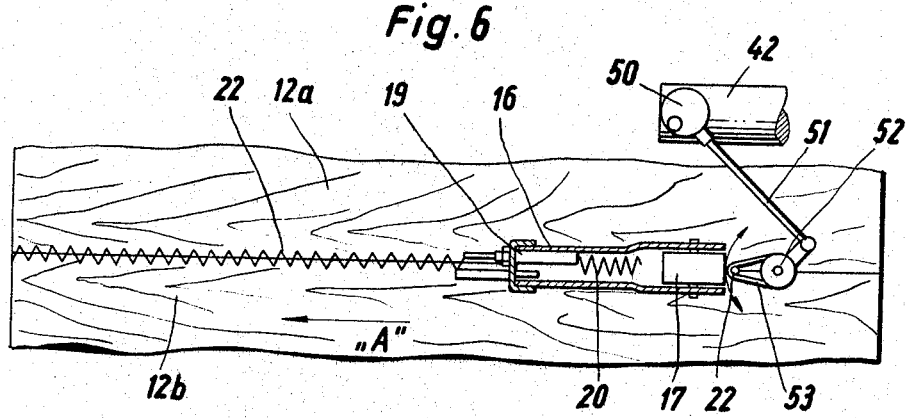
FIG. 6 is a top plan view, partly in section, of the arrangement for thread guiding on the machine of FIG. 3 for sticking two veneers together.

A machine of modified construction for sticking veneers together is illustrated in FIGS. 3 to 7 and has an upright 10 with a worktable 11 on one side at the top in which several counter running plate discs 13a, 13b, conveyor chains or belts or the like are mounted for feeding the veneers 12a, 12b as shown in FIG. 6 to be joined.

Under the worktable 11 a housing 14 is provided which has a driving arrangement (not shown) serving for controlling all devices of the veneer joining machine. The upright 10 is a frame that is closed on all sides but allows access to its interior by doors or the like (not shown) and carries at its upper end on one side a substantially angular housing 15 of narrow width which extends around the worktable 11 and has a recess in the region of the worktable 11 for the passage of the veneers 12a and 12b.

A cylindrical housing 16 is mounted on the end face of the housing 15 above the worktable 11 and accommodates at its front end a resiliently mounted pressure roller 17 the surface of which is rendered free from pores by burnishing or the like to prevent friction. The working pressure of the pressure roller 17 can be resiliently regulated by means of a weight 18 adjustably mounted on the housing 15. In the rear portion of the housing a nozzle 19 is provided for blowing air into the housing 16. A heating coil 20 which heats the inflowing air and consequently the pressure roller 17 brushed thereby (see FIG. 6) is introduced between the nozzle 19 and the pressure roller 17.

The temperature regulation can be effected by equipping the heating coil 20 with a thermostat (not shown). In the lower part of the upright 10 (see FIG. 3) a spool 21 carrying a wound connecting thread 22, such as a glass silk thread, textile thread, plastic thread or the like, is mounted.

A thread guide 23 is arranged in front of the spool 21 in the lower part of the upright 10. Between the thread guide 23 and the spool 21 there is provided a tank 24 containing liquid adhesive and having a downwardly extending thread gluing head 25.

Figure 7:
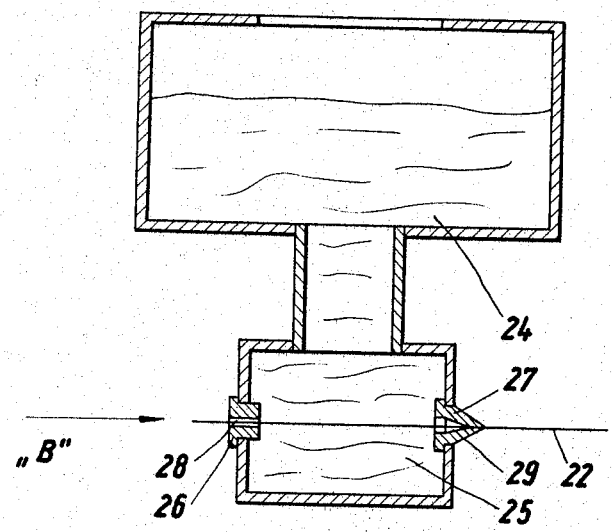
FIG. 7 is a longitudinal section through a gluing arrangement.

In this gluing head 25 two nozzles 26 and 27 are arranged opposite each other and constructed in such a manner that the cylindrical nozzle 26 on the feed inside is equipped with a cylindrical passage 28 which is of larger diameter than the diameter of the thread and sealed on the side directed towards the interior of the tank, whereas the opposite out-feed nozzle 27 has a pointed conical bore 29 pointing in outward direction (see FIG. 7).

In the lower region of the upright 10 two reel wheels 30 and 31 serving as thread feeding device are arranged side by side at a certain distance apart. These wheels 30 and 31 have their axles 30a and 31a arranged at about the same height and coupled by a chain or belt 32 by which they are synchronously driven.

The reel wheel 31 with its axle 31a is displaced out of the horizontal plane in relation to the axle 30a of the reel wheel 30 and stands at a certain inclination to the horizontally mounted reel wheel 30 (see FIG. 5).

The reel wheels 30 and 31 each have a cylindrical hub 33 on the periphery of which a number of, for example eight, spokes 34 are rigidly fixed and uniformly distributed, each spoke carrying on its free end, for example, a rectangular conveying plate 35 of metal or the like extending in the direction of travel of the veneers 12a and 12b (see FIG. 3).

The driving device provided in the housing 14 is driven by a lower motor 36 through the intermediary of a chain or belt 37 or the like. A driving shaft 38 projects out of the housing 14 underneath the worktable 11 and is rotatably mounted at one end in a bearing housing 39 and carries a toothed wheel 40 on the other end portion projecting from the bearing housing 39. This toothed wheel 40 is in mesh with a step-up or step-down transmission gear 41 which transmits the rotary movement of the lower driving shaft 38 to a driving shaft 42 located above the worktable 11.

The upper driving shaft 42 has a worm gear 43 in the range of the step-up or step-down transmission gear 41 which transmits the rotary movement of the driving shaft 42 to the reel wheel 31 through the intermediary of a chain 44 or the like. The reel wheel 31 is equipped with a clutch, for example an electro-magnetic clutch 45 which effects an interruption of the rotary movement transmission enabling the reel wheel 31 to be brought to a standstill while the driving shaft 42 is running.

The control of the electro-magnetic clutch 45 is effected by an upper switch finger 46. The connecting thread 22 running off the reel wheels 30 and 31 and guided over another upper reel wheel 47 of smaller diameter, passes through an eye 46a provided on the free end of the switch finger 46, so that in the event of an excess of thread, the switch finger 46, which normally stands pointing upwards at an incline (see FIG. 3), drops under its own weight and thereby switches off the magnetic clutch 45 so that the connection between the reel wheels 30 and 31 and the driving shaft 42 is interrupted.

To ensure a uniform and smooth running of the thread, two guide rollers 48 and 49 are arranged in the upper portion of the housing 15, the guide roller 48 being provided in the neighbourhood of the switch finger 46 while the other guide roller 49 is provided in the neighbourhood of the housing 16.

On the free end of the driving shaft 42 an eccentric drive 50 is mounted which has a movably mounted push rod 51 which is linked to a nose bearing 52 pivoted on the housing 15. On the underside of the nose bearing 52 pointing towards the pressure roller 17 a guide shoe 53 is fixed which has a shaped extension or arm 54 of wire, sheet metal or the like with an eye at its end. The thread 22 for connecting the veneers 12a and 12b runs through this eye of the extension 54 and is laid on the veneers 12a and 12b by means of the extension 54 swinging to and fro underneath the pressure roller 17 (see direction of arrow in FIG. 6).

The pressure roller 17 is followed by an upper driven feed roller 55a and a lower freely rotatable feed roller 55b which rollers take the joined veneers 12a and 12b from the worktable and convey them out of the machine.

The machine for sticking together veneers in the above described manner operates as follows:

Two veneers 12a and 12b which are to be joined are fed to the resiliently mounted pressure roller 17 in the direction of the arrow A (see FIG. 6) on the worktable 11 with the counterrunning plate discs 13a and 13b sunk therein, which also effect a good abutment of the adjacent edges of the veneers. At the same time the glass silk thread 22 is unwound from the spool 21, and guided by the thread guide 23 to the gluing head 25 (see direction of arrow B in FIG. 7). The thread is coated with adhesive therein and then conveyed to the guide shoe 45 by the reel wheels 30, 31 and 47 and the guide rollers 48 and 49. As the glass silk thread 22 runs through the interior of the upright 10 it dries and, when it reaches the extension 54 of the guide shoe 53, it is in a dry condition. The conveying plates 35 of the reel wheels 30, 31 and 47 are made particularly thin so as not to pick up or destroy the applied adhesive while transporting the glass silk thread 22.

The thread 22 leaving the gluing head 25 is picked up by the conveying plates 35 of the reel wheel 31 and conveyed thereby to the reel wheel 30. Owing to the inclined position of the reel wheel 31, the thread 22 wrapped several times around both reel wheels 30 and 31 travels along a spiral line from the winding side near one edge zone of the wheel 31 to the other edge zone thereof and from there passes to the upper reel wheel 47 (see FIGS. 3 and 5). If more thread 22 is fed by the reel wheels 30 and 31 to the extension 53 than is required, the thread 22 drops downwards between the reel wheel 47 and the guide roller 48 under the action of gravity of the switch finger 46 (see FIG. 3) which, on reaching a certain position, disengages the clutch 45 of the reel wheel 31 running synchronously with the driving shaft 42 and thus brings the reel wheels 30 and 31 to a standstill while the driving shaft 42 continues to rotate and effects the operation of the guide shoe 53.

When the excess thread 22 is used up, the thread is subjected to a certain tension with the result that the switch finger 46 returns into its normal position and thereby reengages the clutch 45 establishing the connection between the driving shaft 42 and the reel wheels 30 and 31 which are again set in motion.

The driving shaft 42 imparts a circular movement to the eccentric drive 50 during the above-described cycle of operations so that the push rod 51 connected to the eccentric drive is moved to and fro. During this reciprocating movement the nose bearing 52 linked to the push rod 51 carries out a pendular swinging movement which is transmitted to the guide shoe 53 fixed thereon (see directions of the arrows in FIG. 6). The glass silk thread 22 running through the extension 54 of the guide shoe 53 is laid on the veneers 12a and 12b in a zig-zag, wavy, serpentine or similar line so that the glass silk thread 22 extends on both sides of the abutting veneer edges.

Air is blown through the nozzle 19 into the interior of the housing 16, brushes against the heating coil 20, is thereby heated and imparts its heat to the pressure roller 17. The pressure roller 17 thus heated, in turn heats the dried adhesive on coming into contact with the glass silk thread 22 and renders this adhesive liquid so that the pressure roller 17 presses the glass silk thread 22 firmly against the veneers 12a and 12b as they pass through the machine thereby establishing a connection between the two veneers 12a and 12b.

The pressure roller 17, being resiliently mounted, always exerts a uniform pressure on the glass silk thread 22 running under it and thereby establishes a suitable connection between the veneers 12a and 12b.

FIGS. 8 and 9 show a modified embodiment of the machine for joining veneers. In a worktable 70, which is for example of rectangular shape, abutment plates 71 are sunk at a certain distance apart one behind the other along the central zone thereof in longitudinal direction, and movable in vertical direction by means of magnets 71a and pressure springs 71b. At each end face of the worktable 70 a vertically upwardly extending carrier frame 72a and 72b is arranged in the upper end of which a guide rail 73 is rigidly held which extends horizontally and parallel to the worktable 70. On this guide rail 73 a carriage 74 is slidably mounted and carries a heated pressure roller 76 in a downwardly extending bracket 75 or the like. In front of the pressure roller 76 a thread guide 78 actuated by an eccentric drive 77 is arranged which consists of an arm or extension 80 forming an eye 79 at its extremity, as in the constructions shown in FIGS. 3 to 7.

Two downwardly extending plates 81 are rigidly mounted on the carriage 74 in front of the thread guide 78 and carry draw-in rollers 82a and 82b arranged at an angle to each other and therefore counterrunning, i.e. operating in the same direction of travel in two directions radiating uniformly from one point. The draw-in rollers 82a and 82b serve for pressing tightly together the veneers 83a and 83b in the working zone.

The working pressure of the pressure roller 76 can be regulated by a weight 84 eccentrically mounted thereon.

The carriage 74 is slidable on the guide rail 73 by means of an upper driving arrangement 85. An upper holding device 86 arranged laterally of the machine holds a stationary spool 87 composed of the wound connecting thread 88, for example a glass silk thread, textile thread, plastic thread or the like. This spool 87 is preceded by a gluing aggregate 89 which is constructed as in the constructions shown in FIGS. 3 to 7. To obtain a uniform run-off and the necessary tension of the thread during the working operation, the unwinding connecting thread 88 is maintained under a certain tension by a spring or the like (not shown). The above-described machine for gluing together veneers operates in the following manner:

The veneers 83a and 83b are placed on the worktable 70 transversely to the working direction one on each side of the abutment plates 71 and pressed with their longitudinal sides in front of the abutment plates 71. The carriage 74 moved in the direction of the arrow C (see FIG. 8) by the driving arrangement 85, grips the veneers 83a and 83b with its front draw-in rollers 82a and 82b, whereby the abutment plates 71 projecting between the juxtaposed veneers 83a and 83b are automatically lowered after a certain time so that the draw-in rollers 82a and 82b, owing to the fact that they run towards each other, pull the veneers 83a and 83b together to form a tight joint.

The connecting thread 88 unwinding from the spool 87, as it runs through the gluing aggregate 89, is coated with an adhesive which dries as it passes to the thread guide 78 with the result that the thread 88 provided with a dry adhesive reaches the eye 79 of the extension 80. The eccentric drive 77 operating in synchronism with the movement of the carriage 74 imparts a circular movement to the thread 78 and a pendular swinging movement to the extension 80 with the eye 79, so that the glass silk thread 88 running through the eye 79 extends in a zig-zag, wavy, serpentine, loop or other form in the region of the abutting veneer edges and consequently travels on both sides of the veneer joint. The heated pressure roller 76 on coming into contact with the connecting thread 88 heats and renders liquid the dry adhesive adhering thereto so that the pressure roller 76 pressing the connecting thread 88 firmly on to the veneers 83a and 83b as the carriage 74 passes thereover establishes a connection between the veneers. The pressure roller 76 being suitably mounted always exerts a uniform pressure on the connecting thread 88 as it rolls thereover and thereby establishes a perfect connection of the two veneers 83a and 83b.

After the carriage 74 has travelled the entire length of the veneers and the connection between two veneers 83a and 83b has been established it travels back into its initial position by reversing the driving arrangement 85, the connected veneers being removed from the worktable 70 and the machine is ready for the next cycle.

In this machine for gluing together veneers the carriage carries out the working movement and the joined veneers remain on the worktable.

The machine proposed by the invention is of simple construction, easy to operate and has the advantage of being compact.

The particular advantage of the invention consists in the great strength of the joint, the elimination of disturbing disadvantages of the former adhesive paper strips and the possibility of attaining high run-through speeds for the veneers. At the same time, due to the thread being thin, a sticking surface of almost one hundred percent is kept free in the region of the joint. Furthermore the expenditure in work and the consumption of material is far more economical than was the case with adhesive paper strips.

I claim:
1. A method of joining a first and second veneer comprising the steps of:
   first, applying an inwardly directed pressure on the outer edges of the veneers to be joined;
   second, depositing, from an alternating feed means, an adhesively coated multifiber thread on the veneers to be joined, the feed means alternating the laying of the thread over the first and second veneers, the adhesive being previously applied to the thread, the thread being subsequently dried and fed onto the veneers to be joined in a dry state;
   third, applying a heated pressure roll to the adhesively coated thread, thereby melting the adhesive and causing the thread to stick firmly to the veneers; and,
   fourth, maintaining the inwardly directed pressure on the veneers until the adhesive on the thread is sufficiently set to maintain the joined relationship of the veneers.

2. The method of claim 1 wherein the multifiber thread is made of a plurality of fibers of glass silk.

3. The method of claim 1 wherein the multifiber thread is made up of a plurality of plastic fibers.

References Cited
UNITED STATES PATENTS

| | | | |
|---|---|---|---|
| 1,105,309 | 7/1914 | Samuel | 156—304 X |
| 1,588,056 | 6/1926 | Rockwell | 144—315 |
| 1,899,067 | 2/1933 | Trumbull | 156—304 X |
| 2,504,673 | 4/1950 | Fischer-Schmutz | 156—546 |
| 2,526,156 | 10/1950 | Quale | 156—177 X |
| 2,701,592 | 2/1955 | Nystrom | 156—546 |
| 2,725,910 | 12/1955 | Kahr | 144—315 |
| 2,801,657 | 8/1957 | Chrisawn | 156—546 |
| 2,974,566 | 3/1961 | Hurley | 156—304 X |

EARL M. BERGERT, *Primary Examiner.*

DONALD R. SCHRAN, HAROLD ANSHER,
*Examiners.*